UNITED STATES PATENT OFFICE.

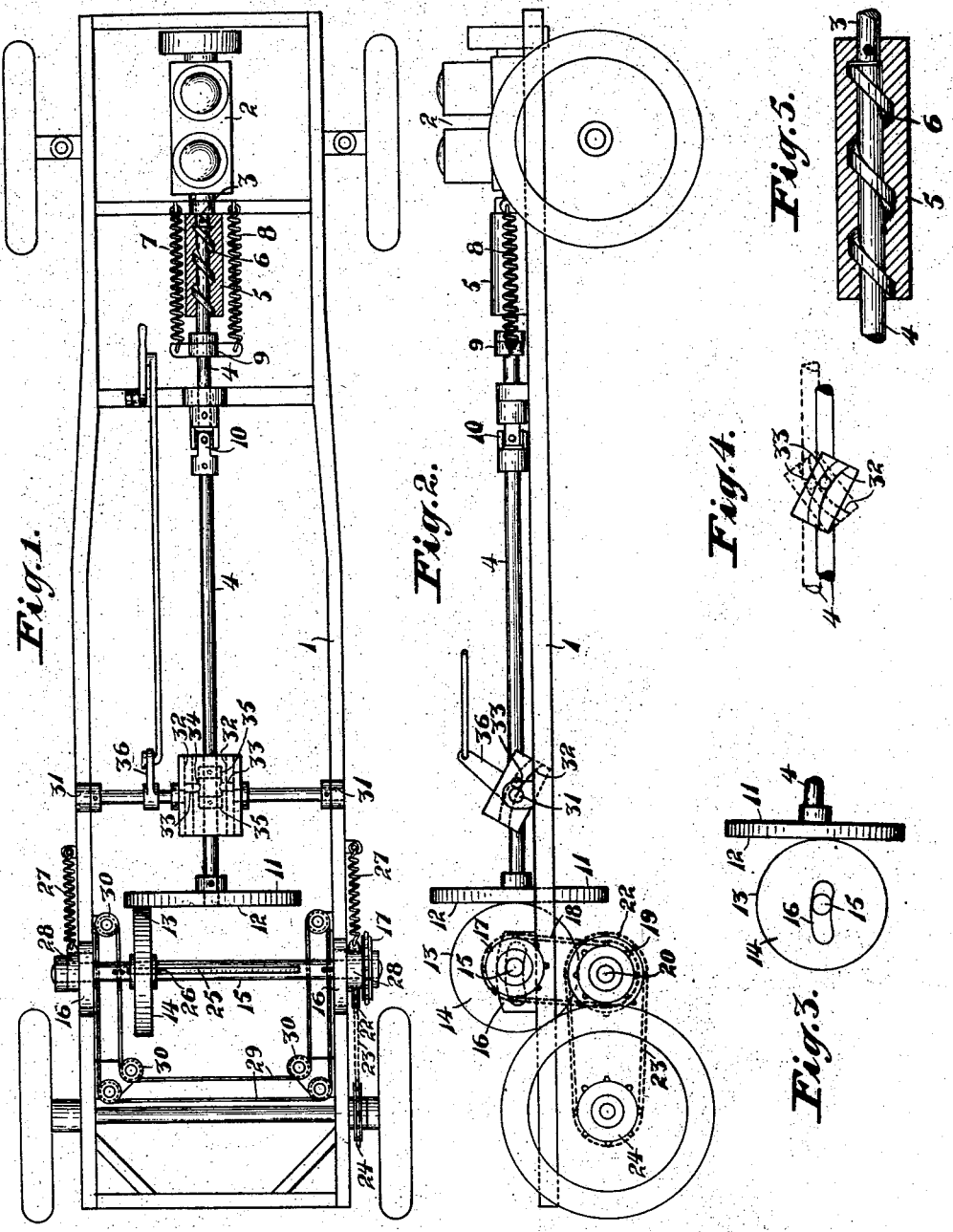

ARTHUR R. MONRO, OF BERKELEY, CALIFORNIA.

AUTOMATICALLY-VARIABLE GEARING.

1,139,433. Specification of Letters Patent. Patented May 11, 1915.

Application filed November 18, 1912. Serial No. 731,939.

*To all whom it may concern:*

Be it known that I, ARTHUR R. MONRO, a citizen of the United States, residing at Berkeley, in the county of Alameda and State of California, have invented certain new and useful Improvements in Automatically-Variable Gearing, of which the following is a specification.

The hereinafter described invention relates to automatically variable friction speed mechanism, designed particularly for use on automobiles, but it may be employed in connection with all driving mechanism when the load to be carried by the engine varies, and is particularly adapted for use in transmission mechanism where the power for operating the same is derived from internal combustion engines.

The invention has for its principal object to provide a frictional transmission mechanism, entirely automatic in its operations, for reducing the speed and proportionately increasing the power from the drive to the driven members, without varying the speed of the engine of the motor vehicle, when the load for the engine becomes too great to be carried thereby when the transmission mechanism is at a given speed position, or of performing the same function when the grade encountered by the automobile is of too great a per cent. for the power of the engine when the transmission mechanism is in a given speed position.

Another object is to provide an automatically variable speed frictional transmission mechanism, which will throw the drive and driven members into neutral position, when the load for the engine or the grade up which it is to be carried becomes too great for the power of the engine when the transmission mechanism is in its lowest speed position.

The invention consists of a drive shaft capable of being elongated and adapted to be rotated by any suitable power, the outer end thereof mounted in an inclined bearing and capable of vertical movement, a friction drive disk carried by the end of said shaft, a friction driven disk carried by a transverse shaft and arranged at right angles to the face of said drive disk, said driven disk being feathered to said counter shaft and capable of horizontal movement over the face of said drive disk, means under tension for normally retaining the center of said drive disk at a point below the contacting points of said drive and driven disks, and means for transmitting power from the counter shaft to the vehicle wheels.

With the above mentioned and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims may be resorted to without departing from the spirit or sacrificing any advantages of the invention.

To comprehend the invention reference should be had to the accompanying sheet of drawings, wherein—

Figure 1 is a top plan view of my improved device as mounted on an automobile frame, disclosing the drive and driven disks in their relative positions when the vehicle is being driven forward at full speed. Fig. 2 is a side elevation disclosing the mechanism for automatically regulating the position of the drive disk relative to the driven disk upon the elongation of the drive shaft, the disks being in their relative positions when the vehicle is being driven forward at full speed. Fig. 3 is a side elevation of the drive and driven disks, the relative positions of the disks being disclosed in a position when the vehicle is being driven at full speed in a reverse direction and the center of the drive disk is above the contacting points of the drive and driven disks. Fig. 4 is a detail view of the inclined guide way for the drive shaft disclosed in full lines in a position when the vehicle is driven forward and in dotted lines when the vehicle is driven in a reverse direction. Fig. 5 is a detail sectional view of the elongating screw positioned in the drive shaft.

Referring more particularly to the drawings, the reference numeral 1 designates a suitable motor vehicle frame, capable of supporting the various parts of my invention, and at the forward end of which is carried an engine 2, provided with an engine shaft 3, which is connected to a suitable vehicle drive shaft 4, by an internally spiral screw-threaded sleeve 5 which receives the screw-threaded end 6 of the shaft 4 and the two shafts are normally retained in their telescoped position by the tension of coiled springs 7 and 8, secured at one end to a collar 9 surrounding the shaft 4 and fastened at their opposite end to a suitable stationary support. The tension of the springs 7 and 8 is such as to retain the two shafts in a telescoped position until the vehicle encounters a steep hill or is loaded to a capacity too great for the engine.

The shaft 4 is provided adjacent the screw-threaded end 6, with a universal joint 10 and secured to the opposite end of said shaft is a circular drive disk 11 the face 12 of which is adapted to contact with the peripheral edge 13 of a driven disk 14, arranged at right angles to the face of the drive disk 11, and carried by a counter shaft 15, slidably mounted in arched guides 16 in the frame 1, and said shaft 15 is provided at its end with a suitable sprocket 17 which is connected by a chain 18 to a sprocket 19 mounted on a shaft 20 supported beneath the frame 1 by brackets, and to said shaft 20 is connected another sprocket 22 around which extend a chain 23 connected to a sprocket 24, mounted on the rear axle of the vehicle.

The counter shaft 15 is provided with a longitudinal slot 25 in which slides a key 26 carried by the hub of the driven disk 14 and the driven disk is limited in its movement over the face of the drive disk 11 by the ends of the slot 25 which terminate at points opposite to the edges of the disk 11.

The driven disk 14 is maintained in engagement with the drive disk 11 by the springs 27 fastened at one end to the frame and at their opposite ends to collars 28 which are carried by the counter shaft 15, and the ends of the shaft 15 are maintained in parallel relation to the face of the drive disk 11 by the flexible equalizing connection 29 which extends around the pulleys 30 supported by the frame.

Pivotally mounted, as at 31, on the frame 1 adjacent the end of the drive shaft 4 are the curved slotted guides 32, in which are adapted to slide the laterally extending arms 33 formed at the opposite sides of a collar 34 rotatably mounted between the flanges 35 projecting outwardly from the drive shaft 4. The direction of inclination of the slots 32 may be regulated by the arm 36 pivotally connected to the frame of the slots, and it will be observed that by changing the angle of the guide slots 32 that the position of the drive disk may be changed relative to the driven disk, to operate the same in a reverse direction.

Assuming the parts to be in the position as disclosed in Figs. 1 and 2 of the drawings, with the horizontal diameter of the drive disk in a position slightly below its contact point with the driven disk, the engine running at high speed, the vehicle carrying its capacity is being propelled on high gear over a level surface and an up grade is encountered, the retarding forces caused by the up grade will be transmitted through the vehicle drive wheels to the driven disk 14 and the driven disk being retarded in its movement relative to the drive disk 11, will have a braking action on the same and the drive disk revolving at its highest speed will exert great torsion at the expansible joint on the drive shaft 4, causing the same to lengthen against the tension of the springs 7 and 8 and the shaft in its lengthening will cause the arms 33 to slide in the slots 32 and in so doing will raise the drive disk upwardly until the horizontal diameter thereof is slightly above the contacting points of the drive and driven disks, at which time the action of the drive disk 11 on the driven disk 14 will force the driven disk longitudinally of the counter shaft 15 in a direction toward the center of the drive disk 11, until the driven disk reaches a point where the gear ratio between the drive and driven disks is such that the grade encountered may be ascended. As the torque exerted by the driven disk on the drive shaft becomes equal to the complementary torque exerted by the springs and screw on the drive shaft, the drive disk will return toward its original position till the axes of the drive and driven disks coincide and the said drive and driven disks will remain in that intermediate-gear relation while the grade is being ascended. If the grade encountered is too steep to be ascended by the vehicle when the drive and driven disks are in any forward speed relation, the drive disk will be elevated by the elongation of the drive shaft caused by the retarding action of the driven disk, and the driven disk will move longitudinally of the counter shaft until it reaches a point opposite the center of the drive disk, and the machine will come to a standstill.

It will be observed that the raising and lowering of the drive disk 11 caused by the elongation of the drive shaft, and the movement of the driven disk longitudinally of the counter shaft is entirely automatic and is caused by the load of the vehicle or the grade encountered by the vehicle.

The drive and driven disks may be thrown into reversing relation by reversing the direction of the incline of the slots 32, which will raise the horizontal axis of the drive disk above the contacting point of the drive and driven disks and the vehicle will be propelled in a reverse direction. When the vehicle is being propelled in a reverse direction and a grade is encountered, the same automatic relation of the drive and driven disks will take place as when the machine is being propelled in a forward direction.

Having thus fully described my invention what is claimed as new and is desired to be protected by Letters Patent is—

1. In a drive mechanism, the combination with a drive member and means for operating the same, a driven member associated with said drive member and operated thereby, and means for automatically varying the relative speed positions of the drive and driven members in accordance with the load carried by the driven member.

2. In a drive mechanism, the combination with a drive member and means for operating the same, a driven member associated with said drive member and operated thereby, and means for automatically varying the relative speed positions of the drive and driven members, said means being operatable by the load carried by the driven member.

3. In a drive mechanism, the combination with a drive member and means for operating the same, a driven member associated with said drive member and operated thereby, and means for automatically changing the speed position of the driven member relative to the drive member in accordance with the load carried by said driven member.

4. In a drive mechanism, the combination with a drive disk and means for operating the same, a driven disk associated with said drive disk and operated thereby, and means for automatically varying the relative speed positions of the drive and driven disks, said means being operatable by the load carried by the driven disk.

5. In a drive mechanism, the combination with a drive member and means for operating the same, a driven member associated with said drive member and operated thereby, and means for automatically changing the speed position of the drive member relative to the driven member in accordance with the load carried by said driven member.

6. In a drive mechanism, the combination with a drive member and means for operating the same, a driven member associated with said drive member and operated thereby, and means for automatically changing the speed position of the driven member relative to the drive member, said means being operatable by the load carried by said driven member.

7. In a drive mechanism, the combination with a drive member, means for operating the same, a driven member associated with said drive member and operated thereby, and means for automatically changing the speed position of the drive member relative to the driven member, said means being operatable by the load carried by said driven member.

8. In a drive mechanism, the combination with a drive member and means for operating the same, a driven member associated with said drive member and operated thereby, and means for automatically altering the relative positions of the axes of the said members, said means being operatable by the load carried by the driven member.

9. In a drive mechanism, the combination with a drive member and means for operating the same, a driven member associated with said drive member and operated thereby, and means for varying the relative speed positions of the drive and driven members by automatically altering the relative positions of the axes of said members.

10. In a drive mechanism, the combination with a drive member and means for operating the same, a driven member associated with said drive member and operated thereby, and means for varying the relative speed positions of the drive and driven members by automatically altering the relative positions of the axes of said members, said means being operatable by the load carried by the driven member.

11. In a drive mechanism, the combination with a power shaft, a drive shaft, a connection between one end of said power and drive shafts whereby the drive shaft is rotated and is capable of longitudinal movement, yieldable means for drawing said shafts toward each other, a drive disk carried by the opposite end of said drive shaft, a guide for supporting the free end of said drive shaft, a rotatably supported driven disk capable of movement over the face of said drive disk and operated thereby, and yieldable means for maintaining said driven disk in contact with said drive disk and for permitting the same to move with a longitudinal movement of said drive shaft.

In testimony whereof I have signed my name to this specification in the presence of two subscribing witnesses.

ARTHUR R. MONRO.

Witnesses:
H. H. TOTTEN,
D. B. RICHARDS.

Copies of this patent may be obtained for five cents each, by addressing the "Commissioner of Patents, Washington, D. C."